United States Patent [19]

Krämer

[11] 4,254,025

[45] Mar. 3, 1981

[54] DISAZO AND POLYAZO DYESTUFFS

[75] Inventor: Erich Krämer, Bergisch-Gladbach, Fed. Rep. of Germany

[73] Assignee: Bayer Aktiengesellschaft, Leverkusen, Fed. Rep. of Germany

[21] Appl. No.: 950,178

[22] Filed: Oct. 10, 1978

[30] Foreign Application Priority Data

Oct. 12, 1977 [DE] Fed. Rep. of Germany ....... 2745777

[51] Int. Cl.³ .................... C07C 107/00; C09B 27/00; C09B 31/30
[52] U.S. Cl. ................................. 260/144; 260/166; 260/176
[58] Field of Search ................ 260/144, 176, 166

[56] References Cited

U.S. PATENT DOCUMENTS

| 4,055,559 | 10/1977 | Csch et al. | 260/176 |
| 4,141,889 | 2/1979 | Allan | 260/144 |
| 4,169,832 | 10/1979 | Wicki et al. | 260/176 |

*Primary Examiner*—John F. Niebling
*Attorney, Agent, or Firm*—Sprung, Felfe, Horn, Lynch & Kramer

[57] ABSTRACT

New disazo and polyazo dyestuffs which, in the form of the free acid, correspond to the general formula

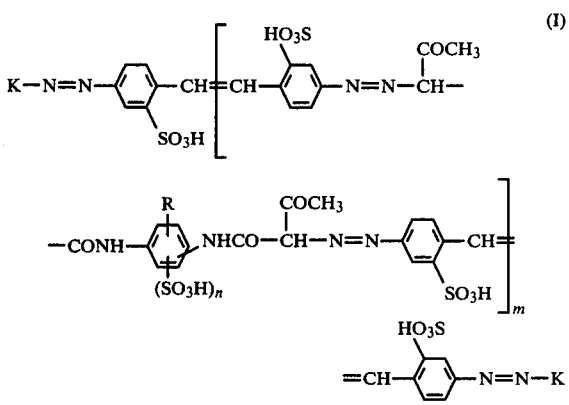

wherein
K, R, m and n have the meaning indicated in the description,
the use of these dyestuffs for dyeing and printing cellulose fibre materials and leather, and concentrated solutions containing azo dyestuffs according to formula (I).

13 Claims, No Drawings

DISAZO AND POLYAZO DYESTUFFS

The invention relates to disazo and polyazo dyestuffs which, in the form of the free acid, correspond to the general formula

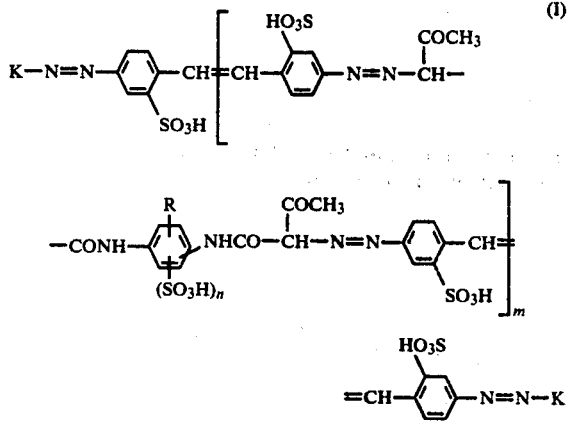

wherein

R denotes hydrogen, methyl, ethyl, methoxy, ethoxy or chlorine, n denotes 0 or 1, K denotes the radical of a coupling component in the case where m is an integer from 1 to 10, but in the case where m is 0, denotes a radical of the formulae

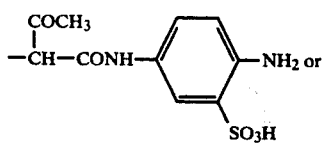

wherein q is 0, 1 or 2, and m denotes a number from 0 to 10.

The second carbamoyl group in the R-substituted benzene nucleus is in the m-position or p-position relative to the first carbamoyl group.

Suitable coupling components KH are those of the hydroxybenzene series, for example those of the formula

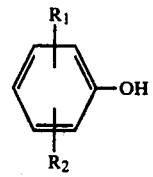

wherein

R₁ and R₂ denote hydrogen, methyl, ethyl or chlorine, those of the acetoacetarylide series, for example those of the formula

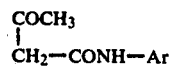

wherein

Ar is a naphthalene radical which is optionally substituted by sulphonic acid groups, or a benzene radical which is optionally substituted by methyl, ethyl, methoxy, ethoxy, chlorine, amino, acetylamino or sulpho, and furthermore those of the aminobenzene series, for examples those of the formula

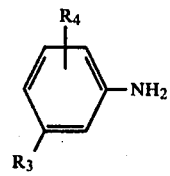

wherein

R₃ denotes hydrogen, amino, hydroxyl or acetylamino and

R₄ denotes hydrogen, methyl, ethyl, methoxy, ethoxy, chlorine or sulpho, and finally those of the aminohydroxynaphthalene series, for examples those of the formula

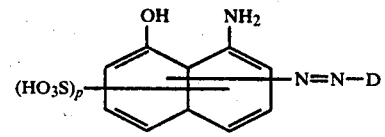

wherein

D denotes the radical of a diazo component and p denotes 1 or 2, the group D—N=N— being coupled in the o-position relative to the amino group or the hydroxyl group.

Preferred dyestuffs are those in which the carboxamide groups of the R-substituted benzene ring are in the p-position relative to one another.

Dyestuffs of the formula (I) wherein m is 1 and R denotes hydrogen are also preferred.

Very particularly preferred dyestuffs correspond to the formula

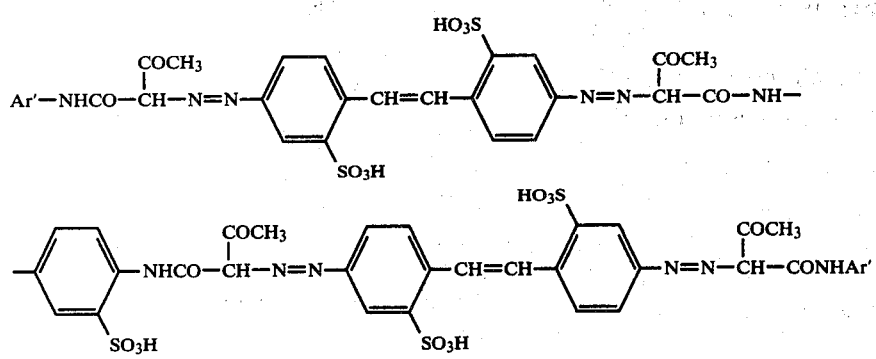

(II)

wherein
Ar' denotes naphthyl which is substituted by 1 to 3 sulpho groups, or 3-sulpho-4-aminophenyl.

Dyestuffs which are also preferred are those of the formula

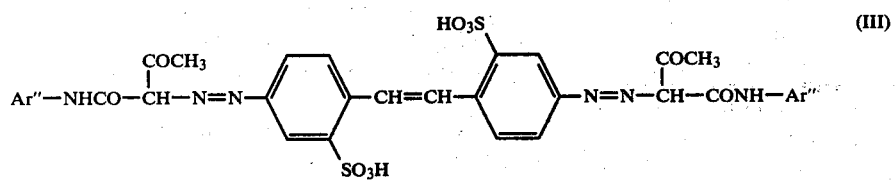

(III)

wherein
Ar" denote radicals of the formulae

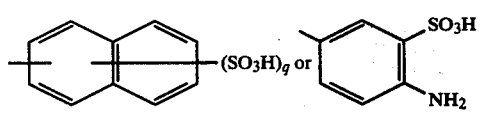

wherein
q has the abovementioned meaning.

Further preferred dyestuffs correspond to the formula in which m denotes 1 are obtained by acetoacetylating a compound of the formula

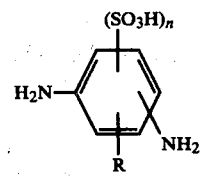

in which
R and n have the meaning already given, on both amino groups with diketene and then coupling the product with a compound of the formula

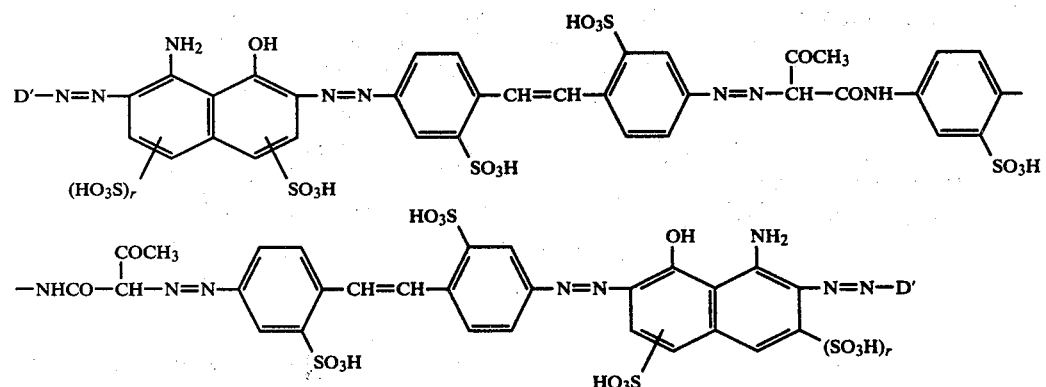

(IV)

wherein
D' denotes phenyl which is optionally substituted by nitro, chlorine, sulpho, methyl or methoxy and r denotes 0 or 1.

Dyestuffs of the formula (I) in which m denotes 0 are obtained by bis-diazotising flavonic acid and then reacting the bis-diazontisation product with the corresponding coupling components. Dyestuffs of the formula (I)

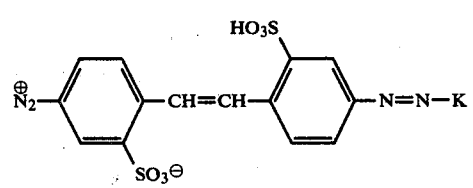

in which
K has the meaning already given, in the molar ratio 2:1. The abovementioned betaine is obtained by coupling bis-diazotised flavonic acid on one side with a coupling component K-H, K having the meaning already given.

Compounds of the formula (I) in which m is greater than 1 are obtained in the form of a mixture by coupling bis-diazotised flavonic acid with mixtures of compounds of the formula

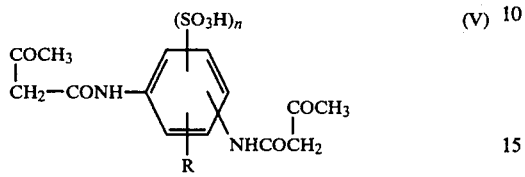

(V)

wherein
R and n have the meaning already given, and coupling components K-H, K having the meaning already given, in the desired molar ratio.

Dyestuffs of the 1-amino-8-hydroxy-naphthalene series with which the flavonic acid couples in the 2-position are obtained by first coupling the bis-diazo component on one side, optionally using coupling accelerators, such as urea, then reacting the coupling product with the component of the formula (V) to give a dyestuff of the formula

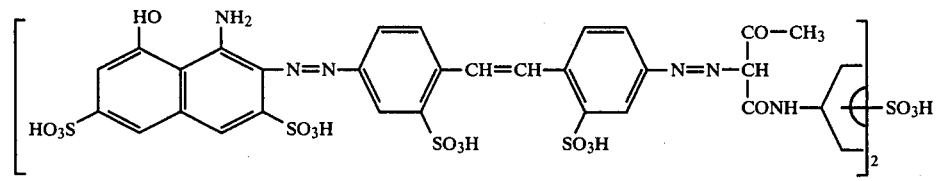

and finally coupling this dyestuff to the diazotised amino compound

D—NH$_2$ in which
D has the meaning already known.

The new dyestuffs are suitable for dyeing and printing leather and cellulose fibre materials, such as cotton and, in particular, paper. The dyeings are particularly clear and have good fastness properties. The new dyestuffs can be processed to give concentrated, stable solutions which can advantageously be employed in paper-dyeing. The concentrated solutions can be particularly easily obtained if, during the preparation of the coupling component (V) or of the acetoacetarylide used as the coupling component, the acylation with diketene is carried out with buffering by hydrophilising tertiary nitrogen bases or quaternary hydrophilising ammonium hydroxides or basic lithium salts, and the product is then coupled with the isolated, bis-diazotised flavonic acid under buffering with the bases mentioned.

Suitable tertiary, hydrophilising nitrogen bases are preferably those of the formula

(VI)

wherein $R_5$ denotes hydroxyalkyl, alkoxyalkyl or a radical of the formula

—(C$_2$H$_4$O)$_n$—R$_8$ and $R_6$ and $R_7$ denote alkyl, hydroxyalkyl, alkoxyalkyl or a radical of the formula —(C$_2$H$_4$O)$_n$—R$_8$, or, together with the N atom, form a saturated 5-membered or 6-membered heterocyclic ring, $R_8$ denotes hydrogen or alkyl and n denotes an integer from 2 to 10.

Suitable quaternary hydrophilising ammonium cations are preferably those of the formula

(VII)

wherein
$R_5$, $R_6$ and $R_7$ have the meaning already given and $R_9$ has the meaning of $R_2$ or $R_3$.

Suitable heterocyclic compounds are pyrrolidine, piperidine, morpholine or piperazine.

Within the formulae (VI) and (VII), those compounds in which the alkyl and alkoxy radicals mentioned contain 1 to 4 C atoms are preferred.

Examples which may be mentioned are: triethanolamine, tris-[2-(2-hydroxyethoxy)-ethyl]-amine, tris-propanol- or -isopropanol-amine, dimethyl- or diethyl-ethanolamine, N-hydroxyethylpiperidine or N-hydroxyethylmorpholine.

Examples of suitable quaternary ammonium bases are trimethyl-(2-hydroxyethyl)-, dimethyl-bis-(2-hydroxyethyl)-, methyl-tris-(2-hydroxyethyl)- or tetra-(2-hydroxyethyl)-ammonium hydroxide.

Lithium hydroxide, carbonate or bicarbonate are advantageously employed as basic lithium salts.

EXAMPLE 1

18.8 g (0.1 mol) of 2,5-diaminobenzenesulphonic acid are stirred in 104 ml of water. 9.4 g (0.112 mol) of freshly distilled diketene are added dropwise at a temperature of 35° C. in the course of 3½ hours and the pH is kept at 3.5 by adding sodium hydroxide solution.

A solution of the compound of the formula

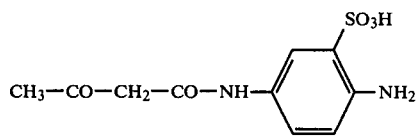

in the form of the Na salt is obtained.

EXAMPLE 2

18.8 g (0.1 mol) of 2,5-diaminobenzenesulphonic acid are stirred in 140 ml of water. 18.8 g (0.224 mol) of freshly distilled diketene are added dropwise at a temperature of 35° C. in the course of 3½ hours and at the same time the pH is kept at 3.5 by adding sodium hydroxide solution.

A solution of the compound of the formula

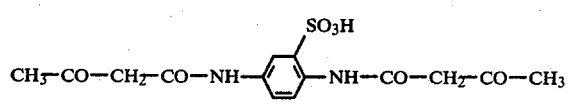

in the form of the Na salt is obtained.

The diaminobenzenesulphonic acids which follow can be mono- or bis-acetoacetylated analogously to Example 1 or 2: 2,4-diaminobenzenesulphonic acid, 2,4-diamino-5-methylbenzenesulphonic acid and 2,5-diamino-4-methoxy-benzenesulphonic acid. If bases other than sodium hydroxide solution are used for buffering, the salts corresponding to the particular base are obtained. The corresponding ammonium salts are obtained with tertiary amines or quaternary ammonium hydroxides.

EXAMPLE 3

2-Aminonaphthalene-5-, -6-, -7- and -8-sulphonic acid and 2-aminonaphthalene-4,8-disulphonic acid can be reacted with diketene analogously to Example 1.

EXAMPLE 4

18.5 g (0.05 mol) of 4,4'-diaminostilbene-2,2'-disulphonic acid (flavonic acid) are dissolved in 400 ml of ice-water with sodium hydroxide solution. 7.0 g of sodium nitrite are added and the solution is allowed to run into 28 ml of hydrochloric acid (of °Bé strength 19.5) and 50 g of ice, whilst stirring. The resulting suspension is subsequently stirred for 30 minutes. Excess nitrous acid is then destroyed with amidosulphonic acid. The solution obtained according to Example 1 is poured in and the mixture is buffered at pH 5-6 with sodium hydroxide solution until the pH remains constant. 15% by volume of sodium chloride are then stirred in and the dyestuff which has precipitated is isolated and dried. It has the formula

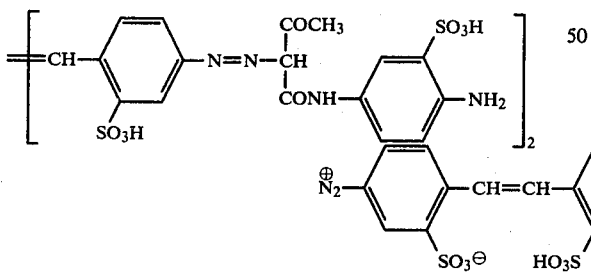

and dyes paper in clear reddish-tinged yellow shades.

EXAMPLE 5

If the solution of 2-acetoacetylaminonaphthalene-6-sulphonic acid prepared according to Example 3 is employed as the coupling component in Example 4, the dyestuff of the formula

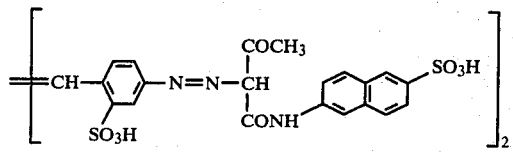

is obtained.

It dyes paper in clear reddish-tinged yellow shades.

If the other acetoacetylaminonaphthalenesulphonic acids indicated in Example 3 are employed, the corresponding dyestuffs are obtained.

EXAMPLE 6

The dyestuffs of Examples 4 and 5 can be obtained in the form of a concentrated solution if, during the preparation of the coupling component, the mixture is buffered with tris-[2-(hydroxyethoxy)-ethyl]-amine instead of sodium hydroxide solution. 20 g of ice are added to the resulting solution, the isolated, bis-diazotised flavonic acid is introduced and the mixture is buffered at pH 5 with tris-[2-(hydroxyethoxy)-ethyl]-amine until the pH remains constant. Stable, concentrated dyestuff solutions are obtianed which can be advantageously employed in paper-dyeing.

EXAMPLE 7

0.1 mol of the dyestuff of the formula

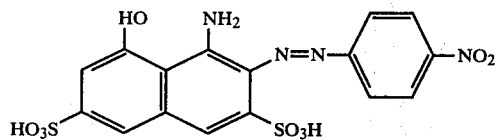

which was isolated after customary coupling at pH <1, is stirred, in the form of an aqueous paste, in 500 ml of water. 0.1 mol of isolated, bis-diazotised flavonic acid, which, as described in Example 4, had been diazotised and then isolated, is introduced. By buffering the mixture at pH 4 with tris-[2-(hydroxyethoxy)-ethyl]-amine, a suspension of the intermediate product of the formula

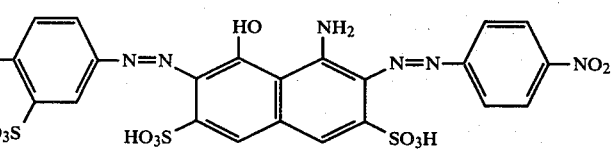

is obtained. 0.05 mol of a solution of 2,5-bisacetoacetylaminobenzenesulphonic acid, which had been obtained according to Example 2 under buffering with tris-[2-(hydroxyethoxy)-ethyl]-amine, is added and the mixture is now buffered at pH 6 with the nitrogen base mentioned until the pH remains constant. After the reaction has ended, a dyestuff solution is obtained which contains the dyestuff of the formula

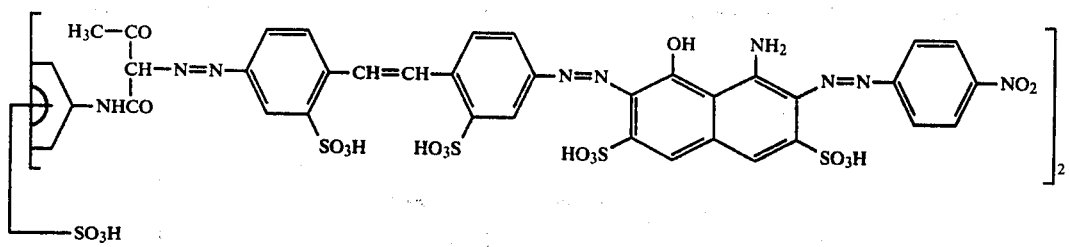

and dyes paper and leather in full green shades.

EXAMPLE 8

The dyestuff of Example 7 can be obtained in the form of a powder if the Na salts of the starting component are employed and sodium carbonate solution is used for buffering. After salting out with 15% of sodium chloride, the dyestuff is isolated and dried.

EXAMPLE 9

36 g (0.1 mol) of flavonic acid are bis-diazotised and isolated, as in Example 4. The paste is carried into a suspension of 23 g (0.1 mol) of 2-amino-4-acetylamino-benzenesulphonic acid in 140 ml of water and 35 g of urea. A pH of 2.5 is maintained for 8 hours with an equimolar mixture of ethanolamine, diethanolamine and triethanolamine. 0.04 mol of the solution of 2,5-bisacetoacetylamino-benzenesulphonic acid, as was obtained according to Example 2 under buffering with tris-[2-(hydroxyethoxy)-ethyl]-amine is then added. The mixture is buffered at pH 5 with the last-mentioned base until the pH remains constant. A dyestuff solution is obtained which dyes paper in orange shades.

EXAMPLE 10

18.8 g (0.1 mol) of 2,5-diaminobenzenesulphonic acid are stirred in 140 ml of water. 10.5 g (0.125 mol) of freshly distilled diketene are added dropwise at a temperature of 35° C. in the course of 3½ hours and the pH is kept at 3.5 by adding tris-[2-(hydroxyethoxy)-ethylv-amine dropwise. A mixture of about 0.08 mol of the monocoupling component 2-amino-5-acetoacetylamino-benzenesulphonic acid and about 0.02 mol of the bis-coupling component 2,5-bisacetoacetylamino-benzenesulphonic acid is obtained. 0.08+0.04/2=0.06 mol of isolated, bis-diazotised flavonic acid is added to the resulting solution and statistical coupling is carried out under buffering with tris-[2-(hydroxyethoxy)-ethyl]-amine until the pH remains constant. 85 of urea are added and the mixture is warmed is 50°-60°. A stable, concentrated solution of a mixture of dyestuffs of the formula

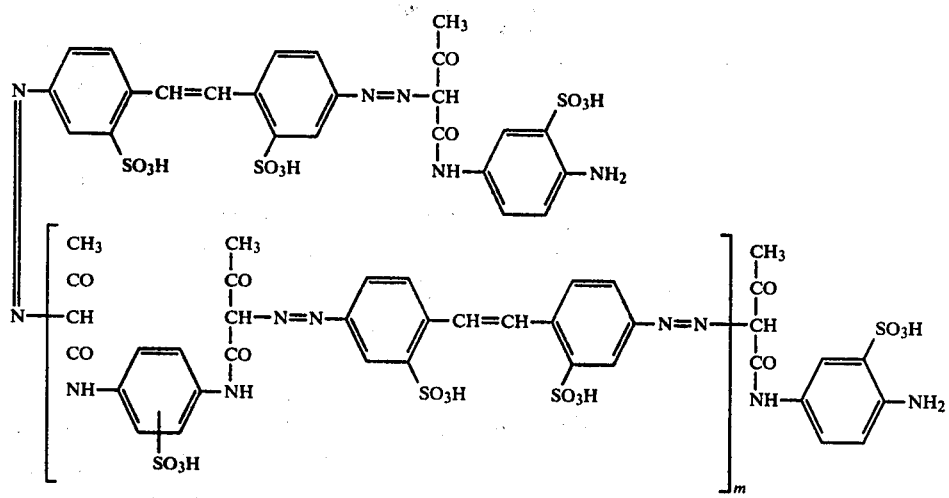

in which m is predominantly 0 or 1, is obtained. The dyestuff solution dyes paper in clear reddish-tinged yellow shades. It has an improved affinity compared with the solution of the dyestuff having a formula in which m denotes 0 (Example 6).

EXAMPLE 11

17.1 g (0.05 mol) of the monosodium salt of 8-amino-1-naphthol-3,6-disulphonic acid (H-acid) are dissolved in 70 ml of water and 70 g of urea with sodium hydroxide solution to give a neutral solution. 7 ml of hydrochloric acid (of °Bé strength 19.5) are then added and a finely dispersed suspension is obtained. 0.05 mol of the flavonic acid bis-diazotised and isolated according to Example 4 is introduced. When H-acid can no longer be detected by chromatography, 0.045 mol of the solution of the Na salt of the 2,5-bisacetoacetylaminobenzenesulphonic acid obtained according to Example 2 is added. The pH is adjusted to 5 with sodium carbonate and maintained until it remains constant. After cooling the mixture to 5° in an ice-bath, the pH is adjusted to 9 with sodium hydroxide solution, and 0.05 mol of the diazotisation product of aniline in the form of the customary aqueous solution is added. The pH is maintained at 9 by means of further sodium hydroxide solution until it remains constant. The reaction mixture is diluted to twice the volume with water and the product is salted out with 15% by volume of sodium chloride, isolated and dried. The resulting dyestuff has the formula

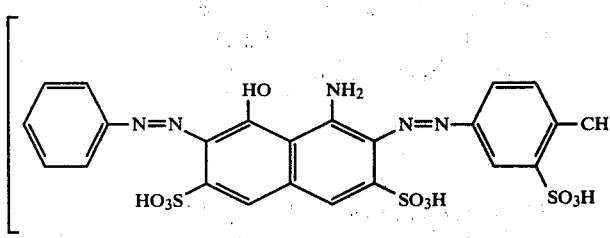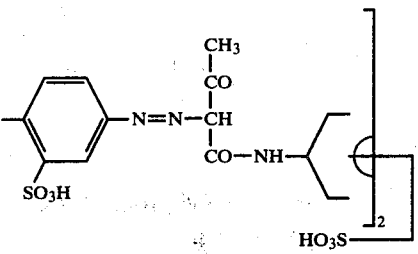

It is a black powder which dyes paper and leather in deep green shades.

EXAMPLE 12

If the procedure followed is as in Example 11, but using 1-amino-8-naphthol-4-sulphonic acid, the dyestuff of the formula

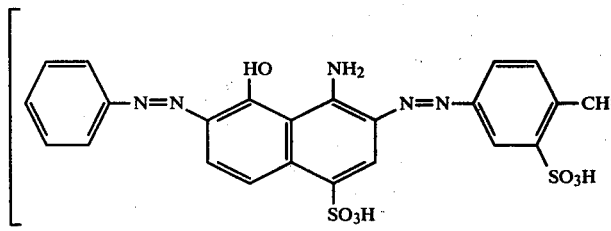

is obtained. It dyes paper and leather in deep green shades.

EXAMPLE 13

0.1 mol of the 2-acetoacetylamino-naphthalene-6-sulphonic acid obtained according to Example 3 is added to 0.1 mol of the suspension obtained, according to Example 4, from the bis-diazotisation of flavonic acid and the mixture is buffered at pH 4 with sodium carbonate. 0.05 mol of the Na salt of 2,5-bisacetoacetylaminobenzenesulphonic acid, obtained according to Example 2, is added to the reaction mixture at a constant pH. The pH is adjusted to 6 and the mixture is buffered with sodium carbonate until the reaction has ended. After adding 10% by volume of sodium chloride, the dyestuff is isolated and dried. It has the formula

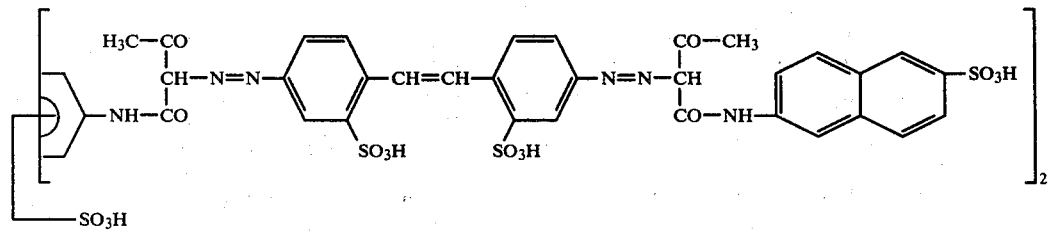

and dyes paper and leather in reddish-tinged yellow shades.

EXAMPLE 14

If the procedure followed is as in Example 13, but the 2,4-bisacetoacetylaminobenzenesulphonic acid, 2,4-bisacetoacetylamino-5-methyl-benzenesulphonic acid or 2,5-bisacetoacetylamino-4-methoxy benzenesulphonic acid obtained according to Example 2 is used as the bis-coupling component. The corresponding dyestuffs are obtained. They dye paper in reddish-tinged yellow shades.

EXAMPLE 15

If the procedure followed is as in Example 13 but 2-acetoacetylaminonaphthalene-4,8-disulphonic acid is employed as the mono-coupling component and 3,5-bisacetocetylamino-4-methyl-benzenesulphonic acid is employed as the bis-coupling component, a dyestuff is obtained which dyes paper in reddish-tinged yellow shades.

EXAMPLE 16

The procedure followed is as in Example 13, but 10.8 g (0.1 mol) of p-cresol are introduced into the bisdiazotisation mixture and the mixture is then buffered at pH 6 with sodium carbonate until the pH remains constant. 0.045 mol of 2,5-bisacetoacetylamino-benzenesulphonic acid (Example 2) in the form of a solution of the Na salt is then added to the reaction mixture under further buffering at pH 6 with sodium carbonate. After the reaction has ended, 10% by volume of sodium chloride are added. The dyestuff is then isolated and dried. The resulting dyestuff dyes paper in reddish-tinged yellow shades and has the formula

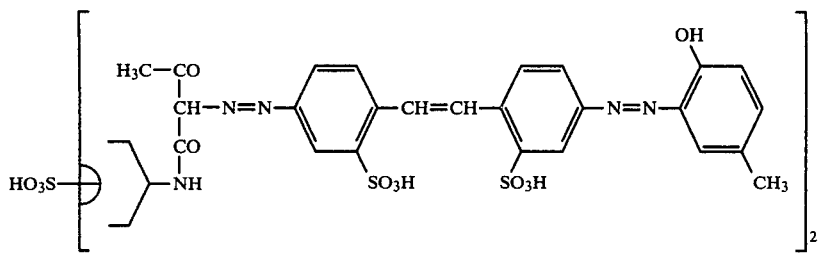

EXAMPLE 17

0.05 mol of flavonic acid are bis-diazotised as in Example 4. 0.04 mol of 2-amino-5-acetoacetylaminobenzenesulphonic acid (Example 1) and 0.03 mol of 2,5-bisacetoacetylamino-benzenesulphonic acid (Example 2) in the form of a solution of their Na salts are added to the suspension. The mixture is buffered at pH 5 with sodium carbonate until the pH remains constant, the reaction mixture is then salted out with 15% by volume of sodium chloride and the product is isolated and dried. The resulting dyestuff mixture has the formula of Example 10, but has a higher proportion of oligomers. The powder dyes paper in reddish-tinged yellow shades.

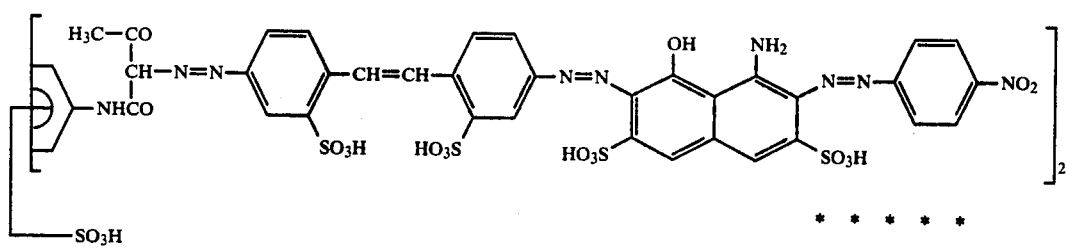

I claim:

1. Azo dyestuffs which, in the form of the free acid, correspond to the general formula

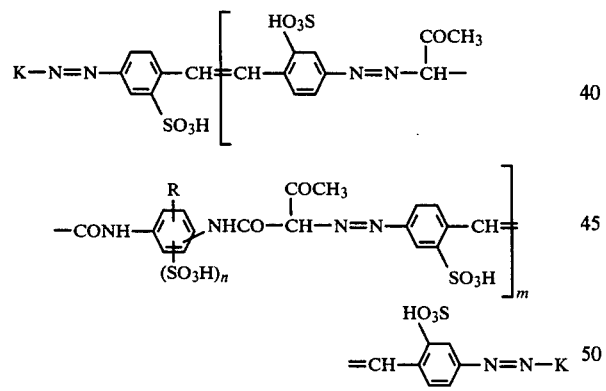

wherein

R denotes hydrogen, methyl, ethyl, methoxy, ethoxy or chlorine, n denotes 0 or 1, K denotes the radical of a coupling component in the case where m is an integer from 1 to 10, the second carbamoyl group in the R-substituted benzene nucleus being in the m-position or p-position relative to the first carbamoyl group.

2. Azo dyestuffs according to claim 1, in which m denotes a number from 1 to 10 and K is the radical of a coupling component of the hydroxybenzene, acetoacetarylide, aminobenzene or aminohydroxynaphthalene series.

3. Azo dyestuffs according to claim 2, wherein K corresponds to the formula

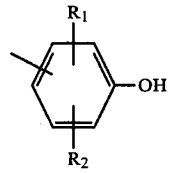

wherein $R_1$ and $R_2$ denote hydrogen, methyl, ethyl or chlorine.

4. Azo dyestuffs according to claim 2, wherein K corresponds to the formula

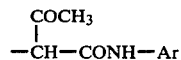

wherein

Ar is a naphthalene radical which is optionally substituted by sulphonic acid groups, or a benzene radical which is optionally substituted by methyl, ethyl, methoxy, chlorine, amino, acetylamino or sulpho.

5. Azo dyestuff according to claim 2, wherein K corresponds to the formula

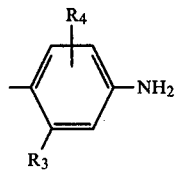

wherein $R_3$ denotes hydrogen, amino, hydroxyl or acetylamino and $R_4$ denotes hydrogen, methyl, ethyl, methoxy, ethoxy, chlorine or sulpho.

6. Azo dyestuffs according to claim 2, wherein K corresponds to the formula

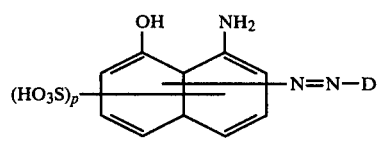

wherein

D denotes the radical of a diazo component and p denotes 1 or 2, the group D—N=N— being coupled in the o-position relative to the amino group or hydroxyl group.

7. Azo dyestuffs according to claim 1, wherein the carboxamide groups of the R-substituted benzene ring are in the p-position relative to one another.

8. Azo dyestuffs according to claim 1, wherein m is 1 and R denotes hydrogen.

9. Azo dyestuff according to claim 1, of the formula

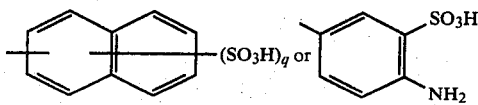

wherein
q is 0 or 1.

11. Azo dyestuffs according to claim 1, of the formula

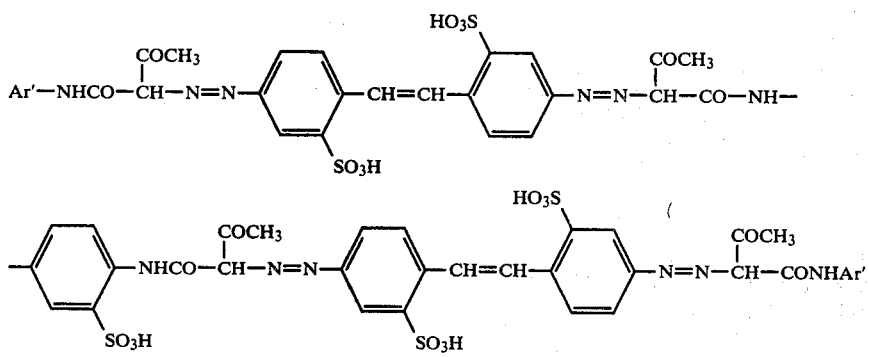

wherein
Ar' denotes naphthyl which is substituted by 1 to 3 sulpho groups, or 3-sulpho-4-aminophenyl.

10. Azo dyestuffs according to claim 1, of the formula

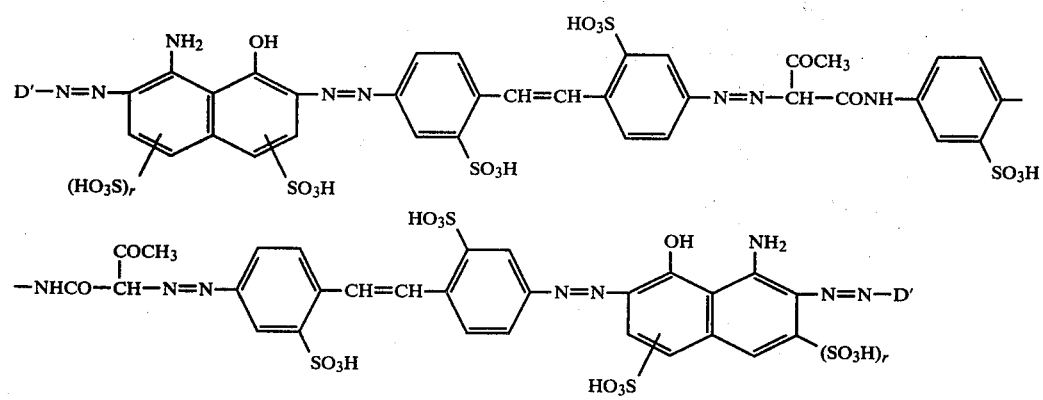

wherein

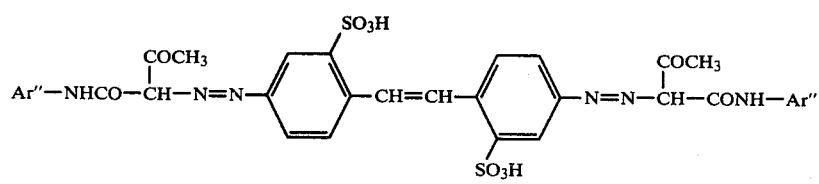

wherein
Ar'' denote radicals of the formulae

D' denotes phenyl which is optionally substituted by nitro, chlorine, sulpho, methyl or methoxy and r denotes 0 or 1.

12. An azo dyestuff according to claim 1 where m is greater than 1.

13. An azo dyestuff according to claim 1 having the formula